United States Patent
Zheng et al.

(10) Patent No.: US 11,877,219 B2
(45) Date of Patent: Jan. 16, 2024

(54) SYSTEMS, APPARATUSES AND METHODS FOR DEVICE PAIRING HAVING RANGE CONTROL AND UNINTENDED DEVICE COEXISTENCE DETECTION

(71) Applicant: Becton, Dickinson and Company, Franklin Lakes, NJ (US)

(72) Inventors: Ping Zheng, Acton, MA (US); Marc Clifford Vogt, Rye, NH (US); Mojtaba Kashef, Boxford, MA (US); Tony Hai Nguyen, Hopkinton, MA (US); Yi Su, Chelmsford, MA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 566 days.

(21) Appl. No.: 16/497,116

(22) PCT Filed: Mar. 20, 2018

(86) PCT No.: PCT/US2018/023269
§ 371 (c)(1),
(2) Date: Sep. 24, 2019

(87) PCT Pub. No.: WO2018/183036
PCT Pub. Date: Oct. 4, 2018

(65) Prior Publication Data
US 2020/0382930 A1 Dec. 3, 2020

Related U.S. Application Data

(60) Provisional application No. 62/478,201, filed on Mar. 29, 2017.

(51) Int. Cl.
*H04W 4/80* (2018.01)
*H04W 4/02* (2018.01)
(Continued)

(52) U.S. Cl.
CPC ............ *H04W 4/80* (2018.02); *H04W 4/023* (2013.01); *H04W 8/005* (2013.01); *H04W 52/245* (2013.01)

(58) Field of Classification Search
CPC ..... H04W 4/80; H04W 52/245; H04W 4/023; H04W 8/005
See application file for complete search history.

(56) References Cited

U.S. PATENT DOCUMENTS

2005/0064870 A1   3/2005 Gabara et al.
2010/0052870 A1   3/2010 King
(Continued)

FOREIGN PATENT DOCUMENTS

JP   2010-141724 A   6/2010
JP   2014-200349 A   10/2014
JP   2015-506738 A   3/2015

OTHER PUBLICATIONS

International Search Report dated Jun. 8, 2018, which issued in corresponding PCT Patent Application No. PCT/US2018/023269.
(Continued)

*Primary Examiner* — Barry W Taylor
(74) *Attorney, Agent, or Firm* — Dickinson Wright PLLC

(57) ABSTRACT

Devices, systems and methods are provided to improve pairing between first and second devices to mitigate risk that either device pairs with an unintended device by reducing transmit power to limit communication range between devices to be paired, using minimum and maximum received signal strength thresholds to reject unintended devices, and instructing user to move to another location when multiple devices are detected for pairing. The second device scanning time for detecting advertising signals from the first device is adjusted to detect multiple device co- (Continued)

existence. Pairing is controlled to occur when the second device is the only device that the first device detects.

20 Claims, 11 Drawing Sheets

(51) Int. Cl.
*H04W 8/00* (2009.01)
*H04W 52/24* (2009.01)

(56) References Cited

U.S. PATENT DOCUMENTS

| | | |
|---|---|---|
| 2012/0238851 A1 | 9/2012 | Kamen et al. |
| 2013/0030852 A1 | 1/2013 | Quadracci |
| 2014/0256260 A1* | 9/2014 | Ueda ................. H04L 63/18 455/41.2 |
| 2014/0273824 A1* | 9/2014 | Fenner .............. H04L 63/0823 455/41.1 |
| 2015/0271432 A1 | 9/2015 | Muth |
| 2016/0100310 A1* | 4/2016 | Lee ................... H04W 76/14 713/171 |
| 2016/0278156 A1* | 9/2016 | Yang ................. H04W 76/14 |
| 2017/0181628 A1* | 6/2017 | Burnette ............ A61B 5/0004 |
| 2018/0182491 A1* | 6/2018 | Belliveau ........... A61B 5/0004 |

OTHER PUBLICATIONS

Bluetooth Specification Version 4.2, Dec. 2, 2014, Architecture, 11 pages.

* cited by examiner

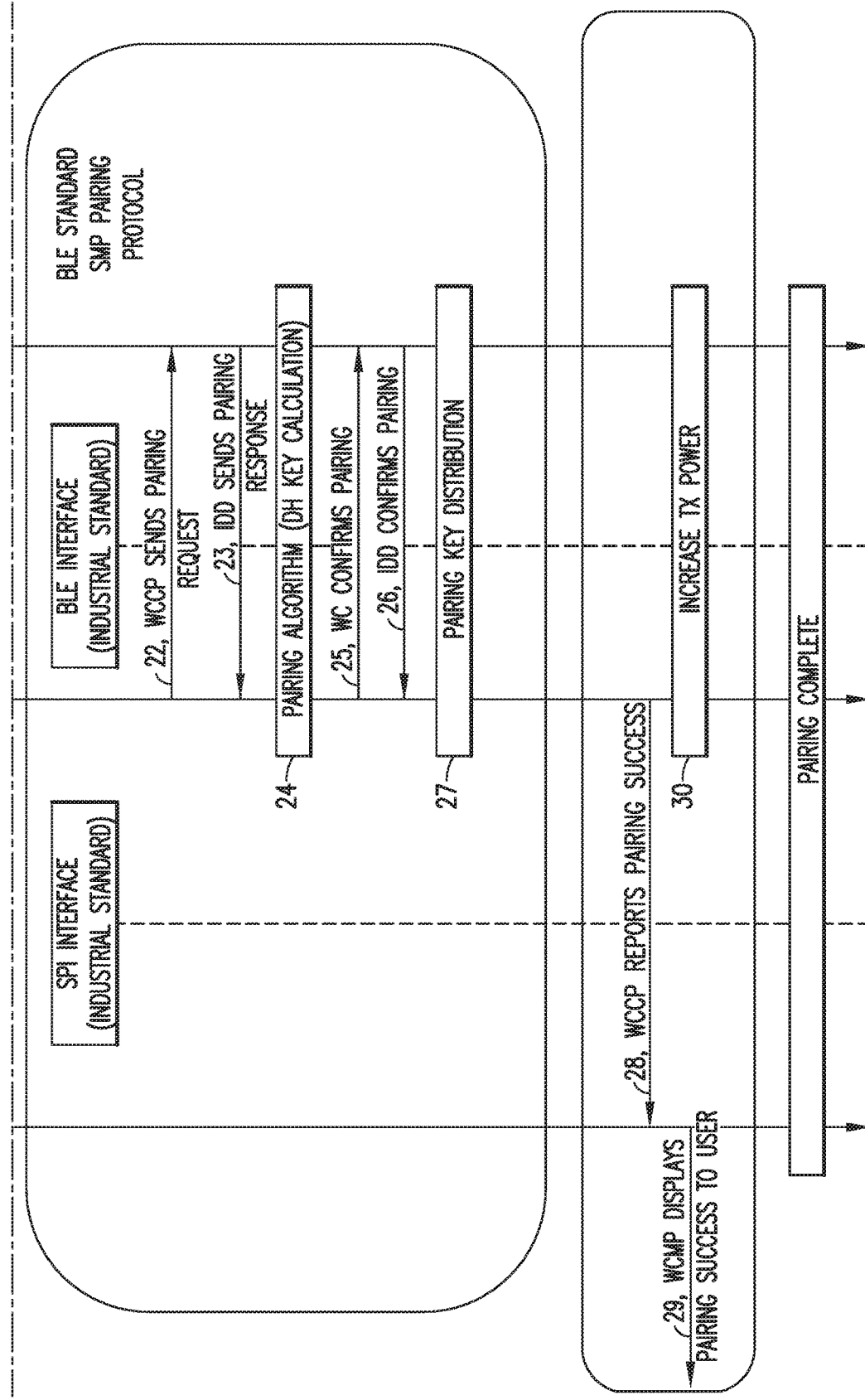

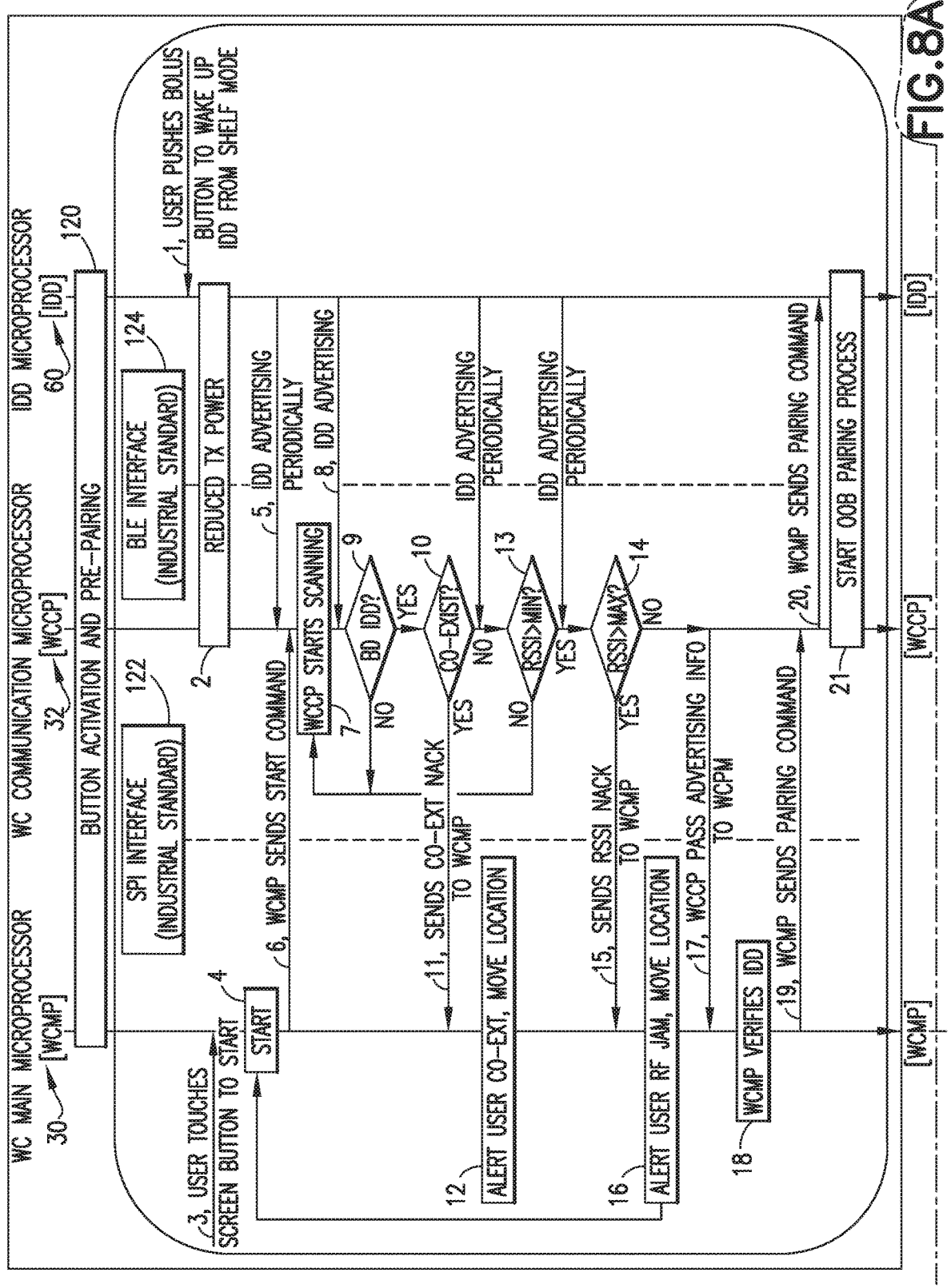

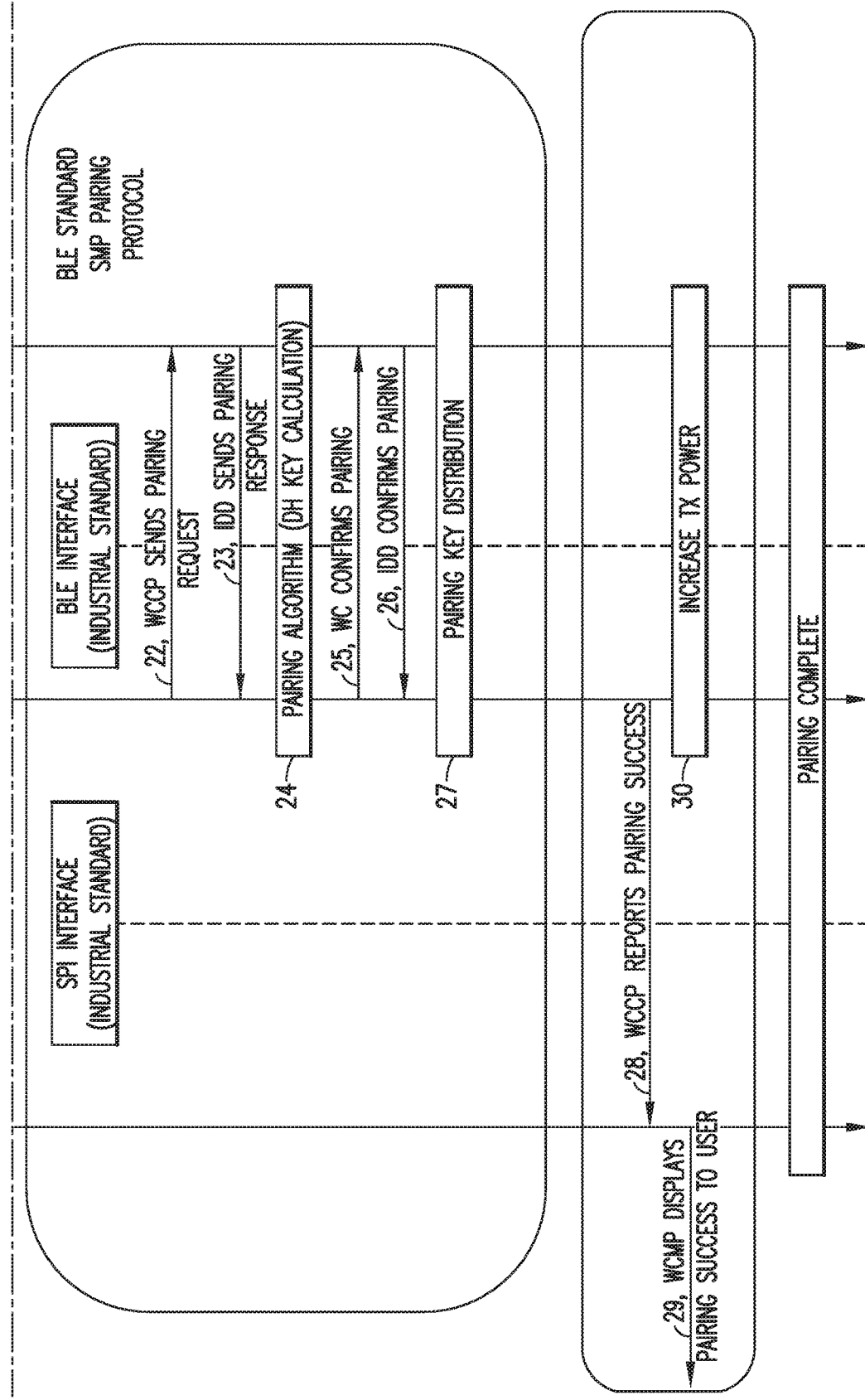

SYSTEMS, APPARATUSES AND METHODS FOR DEVICE PAIRING HAVING RANGE CONTROL AND UNINTENDED DEVICE COEXISTENCE DETECTION

BACKGROUND OF THE INVENTION

Field of the Invention

The present invention relates to systems, methods and apparatuses for pairing two devices, and particularly to using range control and unintended device coexistence detection to minimize pairing between a device and an unintended device.

Description of Related Art

Demand for on-body medical devices (e.g., wearable infusion pumps) and body area network (BAN) medical devices (e.g., handheld blood glucose meters, smart phones with diabetes management apps, and wireless controllers for on-body devices) has been increasing along with an increase in patients' and healthcare providers' desire for better and more convenient patient management of medical conditions such as diabetes.

Secure pairing between two devices, such as between a wearable medical device and a separate dedicated controller or smart phone with app related to the wearable medical device, is important to avoid unintended operations, or possibly malicious interference with the operations, of the medical device. Further, avoidance of pairing the medical device with another unintended device is also important, particularly when there are multiple potential devices with which a medical device can be paired within the same area.

A need exists for secure pairing of a medical device with an intended device, even when multiple devices are within the range of signals used for pairing operations.

SUMMARY OF THE INVENTION

The above and other problems are overcome, and additional advantages are realized, by illustrative embodiments of the present invention.

It is an aspect of illustrative embodiments of the present invention to provide a method of pairing a first device with a second device for wireless communication therebetween comprising: the first device transmits signals for a selected duration at selected intervals and in a selected radio frequency range; the second device scans for signals in the selected radio frequency range, the second device being provided with signal strength data related to respective signals detected when scanning; the second device determines whether the signal strength data for at least one of the detected signals satisfies signal strength criteria whereby the signal strength data is greater than a selected minimum signal strength criterion and is less than a selected maximum signal strength criterion; the second device determines whether the detected signals are from either the first device or another device; the second device sends the first device a pairing command when the detected signals satisfy the signal strength criteria and the second device determines that the detected signals are only from the first device and not from another device.

In accordance with aspects of illustrative embodiments of the present invention, the second device alerts a user to move to another location to attempt pairing the first device with the second device when either the signal strength data for at least one of the detected signals is more than a selected maximum signal strength criterion, or the detected signals are from another device and not the first device. Further, the second device ignores the detected signals having signal strength data that is less than the selected minimum signal strength criterion.

In accordance with aspects of illustrative embodiments of the present invention, the first device has an identifier shared by other devices similar to the first device, and the second device is configured to pair in a selected time period with any one of the first device and the other devices sharing the identifier and not with other devices which do not share the identifier.

In accordance with aspects of illustrative embodiments of the present invention, the second device can determine whether the detected signals are from either the first device or another device before determining whether the signal strength data for at least one of the detected signals satisfies signal strength criteria.

In accordance with aspects of illustrative embodiments of the present invention, the selected radio frequency range can be 2.40-2.48 Gigahertz (GHz) range.

In accordance with aspects of illustrative embodiments of the present invention, the method further comprises: the first device reduces its transmit power before transmitting its signals for the selected duration at the selected intervals and in the selected radio frequency range; the first device receives the pairing command; and the first device increases its transmit power after pairing with the second device is completed. For example, the first device reduces its transmit power before pairing is completed to a transmit power level that limits the communication range between the first device and the second device to a selected distance. The selected distance is, for example, between 0 and 20 inches.

In accordance with aspects of illustrative embodiments of the present invention, the second device scans for signals in the selected radio frequency range during scanning intervals, each scanning interval comprising a scanning window of a duration longer than two of the selected intervals followed by a non-scanning period to detect if other devices are transmitting signals at the selected intervals and in the selected radio frequency range in addition to the first device.

In accordance with aspects of illustrative embodiments of the present invention, the second device scans for signals in the selected radio frequency range during scanning intervals, each scanning interval comprising a scanning window of a duration longer than two of the selected intervals followed by a non-scanning period to detect if other devices are transmitting signals at the selected intervals and in the selected radio frequency range in addition to the first device.

In accordance with aspects of illustrative embodiments of the present invention, if the second device detects a signal during a scanning window, then the second device stops scanning and performs at least one or more of various checks selected from the group consisting of determining whether identifying data in the signal corresponds to an intended device for pairing, determining whether received signal strength data related to the signal satisfies one or more signal strength criteria, and determining whether the signal is from the first device and not from another device, and the second device continues scanning when any of the checks fails.

In accordance with aspects of illustrative embodiments of the present invention, a device configured for pairing with a second device for wireless communication therebetween comprises: a radio frequency (RF) interface for transmitting and receiving RF signals, the received RF signals comprising advertising signals of selected duration transmitted from the second device at selected intervals in a selected RF range; and a controller configured to scan for signals in the selected radio frequency range, the controller being provided with signal strength data related to respective signals detected when scanning; determine whether the signal strength data for at least one of the received RF signals satisfies signal strength criteria whereby the signal strength data is greater than a selected minimum signal strength criterion and is less than a selected maximum signal strength criterion; determine whether the detected signals are from either the second device or another device; and send the second device a pairing command when the detected signals satisfy the signal strength criteria and the controller determines that the detected signals are only from the second device and not from another device.

In accordance with aspects of illustrative embodiments of the present invention, the controller scans for signals in the selected RF range during scanning intervals, each scanning interval comprising a scanning window of a duration longer than two of the selected intervals followed by a non-scanning period to detect if other devices are transmitting signals at the selected intervals and in the selected radio frequency range in addition to the first device.

In accordance with aspects of illustrative embodiments of the present invention, the controller alerts a user to move to another location to attempt pairing of the second device when either the signal strength data for at least one of the detected signals is more than a selected maximum signal strength criterion, or the detected signals are from another device and not the second device.

In accordance with aspects of illustrative embodiments of the present invention, the controller ignores the detected signals having signal strength data that is less than the selected minimum signal strength criterion.

In accordance with aspects of illustrative embodiments of the present invention, the second device has an identifier shared by other devices similar to the second device, and the controller is configured to pair in a selected time period with any one of the second device and the other devices sharing the identifier and not with other devices which do not share the identifier.

In accordance with aspects of illustrative embodiments of the present invention, the controller scans for signals in the selected radio frequency range during scanning intervals, each scanning interval comprising a scanning window of a duration longer than two of the selected intervals followed by a non-scanning period to detect if other devices are transmitting signals at the selected intervals and in the selected radio frequency range in addition to the second device.

In accordance with aspects of illustrative embodiments of the present invention, if the controller detects a signal during a scanning window, then the controller stops scanning and performs at least one or more of various checks selected from the group consisting of determining whether identifying data in the signal corresponds to an intended device for pairing, determining whether received signal strength data related to the signal satisfies one or more signal strength criteria, and determining whether the signal is from the second device and not from another device, and the controller continues scanning when any of the checks fails.

In accordance with aspects of illustrative embodiments of the present invention, if the controller fails to detect a signal during a scanning window, then the controller continues scanning over a series of scanning intervals for a selected amount of time.

Additional and/or other aspects and advantages of the present invention will be set forth in the description that follows, or will be apparent from the description, or may be learned by practice of the invention. The present invention may comprise devices to be paired and methods for operating same having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The above and/or other aspects and advantages of embodiments of the invention will be more readily appreciated from the following detailed description, taken in conjunction with the accompanying drawings, of which:

FIG. 8 is a diagram of operations of the medical device and the controller depicted in FIGS. 2A and 2B and in accordance with another illustrative embodiment of the present invention.

Throughout the drawing figures, like reference numbers will be understood to refer to like elements, features and structures.

DETAILED DESCRIPTION OF ILLUSTRATIVE EMBODIMENTS

Figure 1:
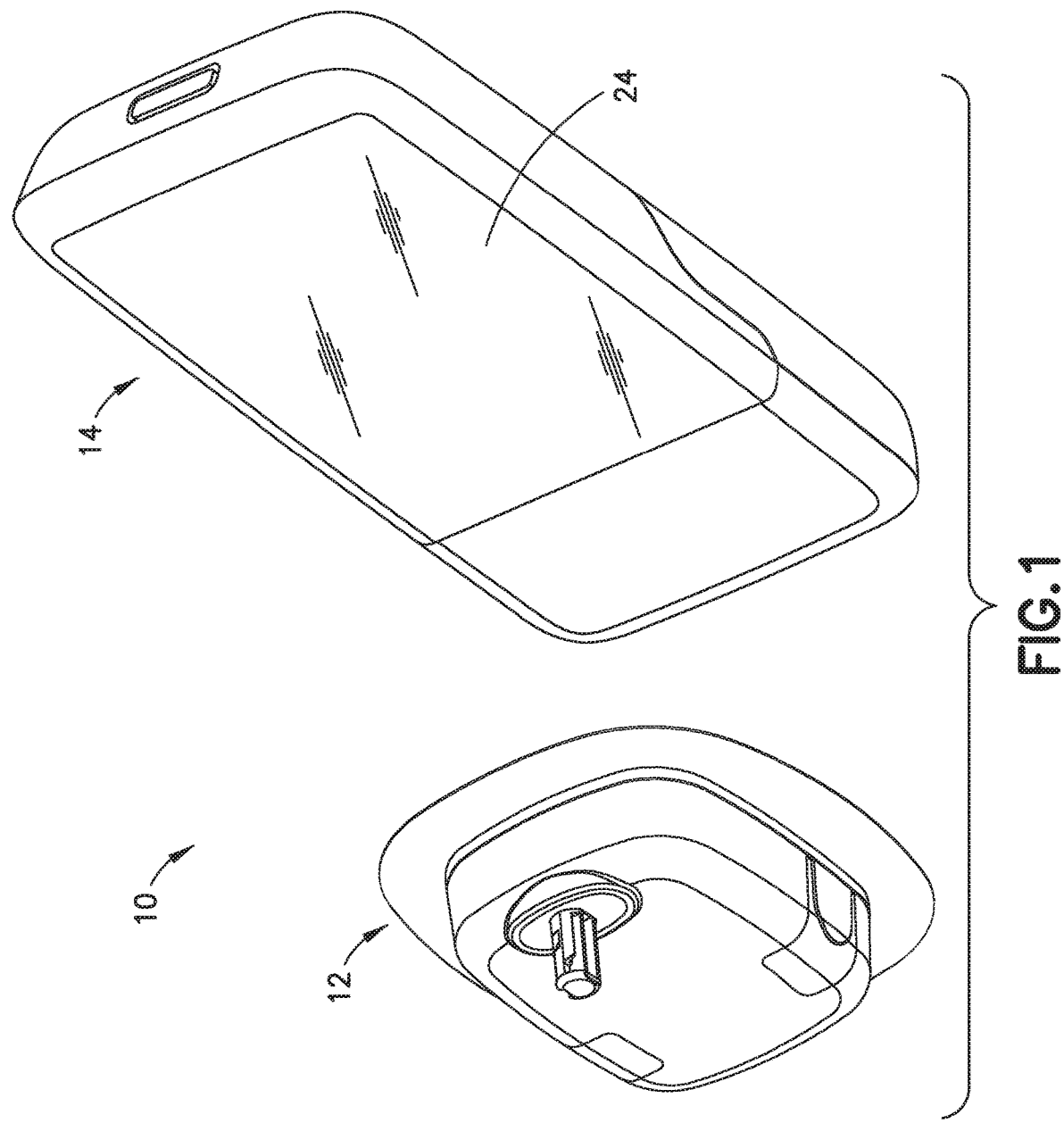
FIG. 1 depicts a medical device and a controller in accordance with an illustrative embodiment of the present invention.

Reference will now be made in detail to embodiments of the present invention, which are illustrated in the accompanying drawings. The embodiments described herein exemplify, but do not limit, the present invention by referring to the drawings.

Figure 2A:
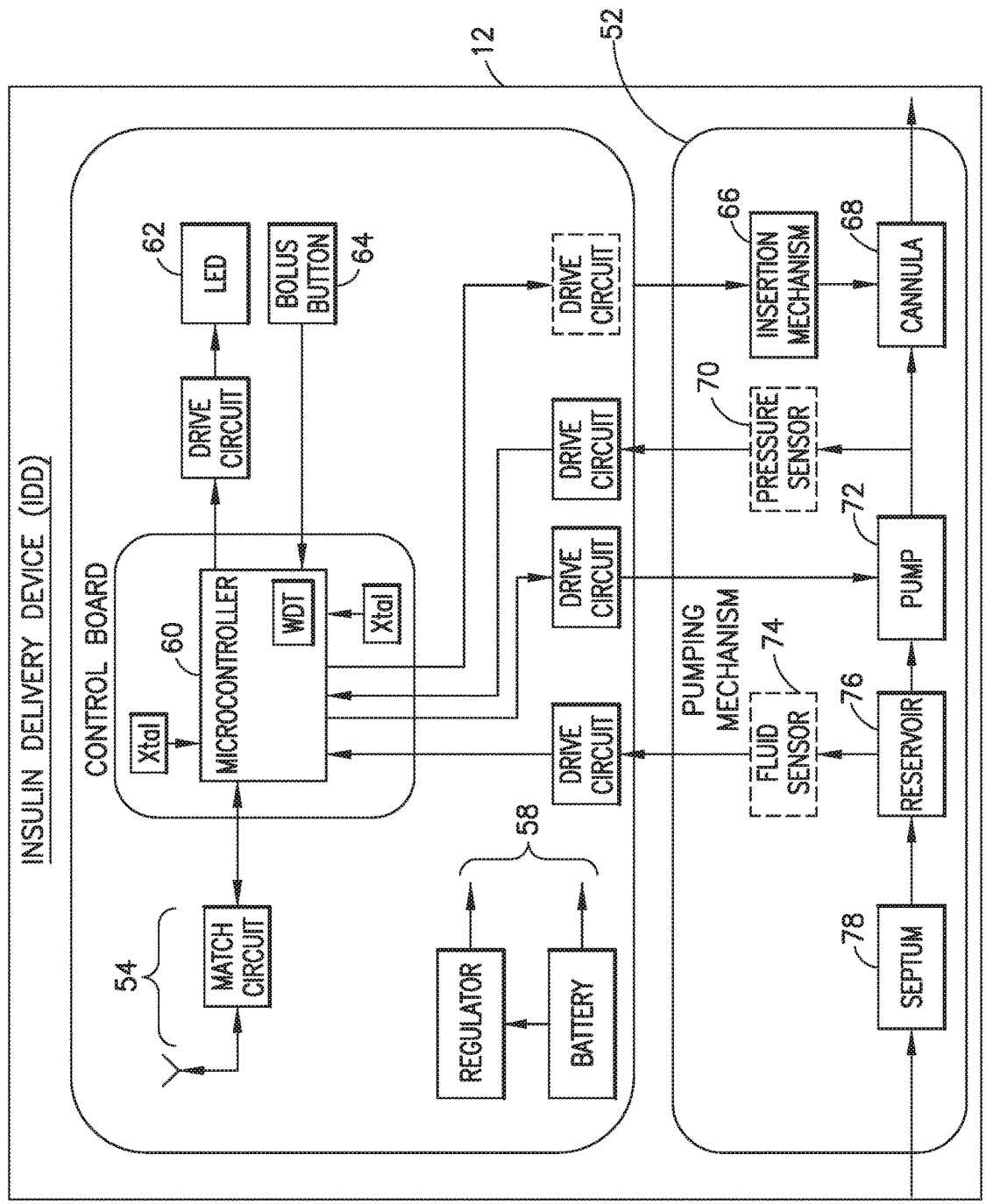
FIGS. 2A and 2B are block diagrams of the medical device and the controller in accordance with an illustrative embodiment of the present invention.
Figure 2B:
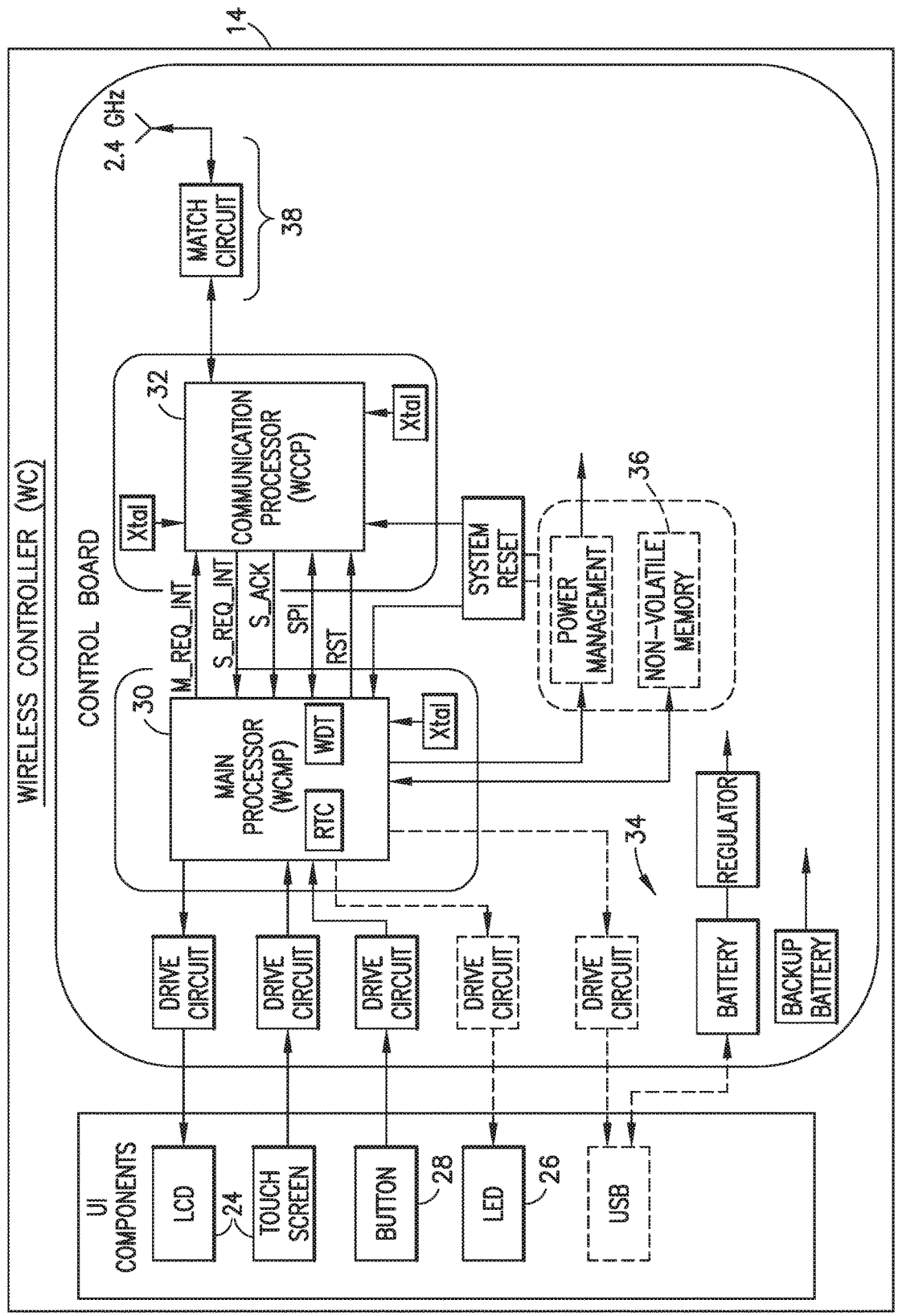

With reference to FIGS. 1, 2A and 2B, an illustrative medication delivery system 10 is shown having a medical device 12 and a controller 14 with display 24 or other user interface.

The medical device 12 can be a wearable device or a patient-carried device. The medical device 12 can have an integrated user interface as its controller 14, or the medical device can be configured to be controlled by a separate controller device such as a wireless controller 14 as shown in FIG. 1. In the illustrated embodiment, the medical device 12 is controlled by a wireless controller 14, but it is to be understood that aspects of the present invention apply to a medical device 12 with its own controller and another device 14 to be paired with the medical device 12.

For example, the medical device 12 can be a disposable insulin delivery device (IDD) for single patient use that is configured for continuous subcutaneous delivery of insulin at set and variable basal (24-hour period) rates and bolus (on-demand) doses for the management of patients with Type 2 Diabetes Mellitus (T2DM) requiring insulin therapy. It is to he understood, however, that the medical device 12 can be any on-body medical device (e.g., wearable infusion pump, continuous glucose meter) or body area network (BAN) medical device (e.g., handheld blood glucose meter, smart phone with medical condition management apps, or wireless controller for on-body device).

The IDD 12 is part of a system 10 that is an advanced insulin delivery system for use by patients with Type 2 Diabetes Mellitus (T2DM). It is configured for 24-hour-a-day use in all environments typically inhabited by the target users. It is configured for the patient user to wear the IDD for a period of three days (up to 84 hours). It has four (4) main functions: delivering user-set daily basal insulin rate; delivering user-set bolus insulin amount; delivering manual bolus insulin dose(s); and generating system status and notifications. The system addresses an unmet need for many Type 2 patients on multiple daily injections (MDI) requiring discreet, simple and cost effective insulin delivery alternative to the traditional complex insulin pump. It is to be understood, however, that the medical device 12 can be used to deliver any type of fluid and is not limited to insulin delivery or delivery to only Type 2 diabetes patients.

The Wireless Controller (WC) 14 is used to program the body-worn IDD to deliver a daily basal insulin rate and meal-time insulin amount to the patient. The WC 14 also provides status information of the IDD 12 as well as notifications to the user. The body-worn IDD 12 stores and administers insulin to the patient subcutaneously. The IDD sends feedback to the patient via the WC if it detects issues (e.g., low volume in the reservoir, low battery). An important function supported by communication software in the system 10 is the wireless communication between the WC 14 and IDI) 12, which enables the IDD 12 to provide the feedback to the WC 14 and for the user to control their insulin delivery by the IDD 12 wirelessly via the WC 14 in a simple and discrete way.

In the illustrated embodiment shown in FIG. 2A, the MD 12 has a microcontroller 60 configured to control a pumping mechanism 52, wireless communication with the WC 14 (e.g., via an RF circuit 54 having a match circuit and antenna), and pump operations. The IDD has a bolus button(s) 64 for manual delivery of medication in addition to programmed delivery of medication. The pumping mechanism 52 comprises a reservoir 76 for storing a fluid medication (e.g., insulin) to be delivered via a cannula 68 to the patient wearing the IDD, and a pump 72 for controllably delivering designated amounts of medication from the reservoir through the cannula. The reservoir 76 can be filled via a septum 78 using a syringe. The IDD has a manual insertion mechanism 66 for inserting the cannula 68 into a patient; however, the processor 60 can be configured to operate an optional drive circuit to automate operation of the insertion mechanism 66 to deploy the cannula 68 into the patient. Further, the MD 12 can be optionally provided with a fluid sensor 74 or a pressure sensor 70. An LED 62 can be operated by the microcontroller 60 to be on or flash during one or more pump operations such as during reservoir priming, for example. The IDD 12 is powered by a battery and regulator as indicated at 58. When initializing the IDD 12 (e.g., powering on to begin pairing with the WC 14), the bolus button(s) 64 can be configured as wake-up button(s) that, when activated by the user, causes the IDD 12 to wake from a power conserving shelf mode.

In the illustrated embodiment shown in FIG. 2B, the WC 14 is implemented as a dual microprocessor component having: 1) a WC Main Processor (WCMP) 30, and a WC Communications Processor (WCCP) 32. The WCMP 30 is connected to the user interface (UI) components such as the LCD display with touch screen 24, one or more buttons 28, LED indicator 26, and the like. The WCCP 32 is connected to radio frequency (RF) components 38 (e.g., an antenna and a match circuit) and is mainly responsible for the WC 14's wireless communication with the IDD 12. The two processors 30, 32 communicate with each other through a serial peripheral interface (SPI). The two processors 30, 32 can also interrupt each other through two interrupt pins, M_REQ_INT and S_REQ_INT.

With continued reference to FIG. 2B, the WC 14 is designed to be non-field serviceable (i.e. no parts to be inspected, adjusted, replaced or maintained by the user), except for replaceable alkaline batteries 34 for power. A non-volatile memory (e.g., FLASH memory) 36 is provided in the WC to store delivery and status data received from the IDD 12 such as delivery dates and times and amounts.

The LCD with capacitive touch screen 24 serves as the visual interface for the user by rendering visual and graphical outputs to the user (e.g., system information, instructions, visual notices, user configurations, data outputs, etc.), and by providing a visual interface for the user to enter inputs (e.g., device operation inputs such as IDD pairing and set up and dosing, and configuration parameters, and so on). The WC display with capacitive touch screen 24 detects (at least) single-touch gestures over its display area. For example, the touch screen is configured for recognizing user tactile inputs (tap, swipe, and button press), allowing for navigation within UI screens and applications. The touch screen 24 aids in executing specific system functionalities (i.e. IDD 12 setup and pairing with the WC 14, insulin dosing, providing user with dosing history, and IDD deactivation and replacement with another IDD, and so on) through specific user interactions. The WC 14 can also include a button 28 such as a device wake-up button that, when activated by the user, causes the WC 14 to wake from a power conserving sleep mode. The WC 14 can also have an LED 26 to indicate low battery status (e.g., indicate low battery state when there is 12 hours or less of usage remaining).

Figure 3:
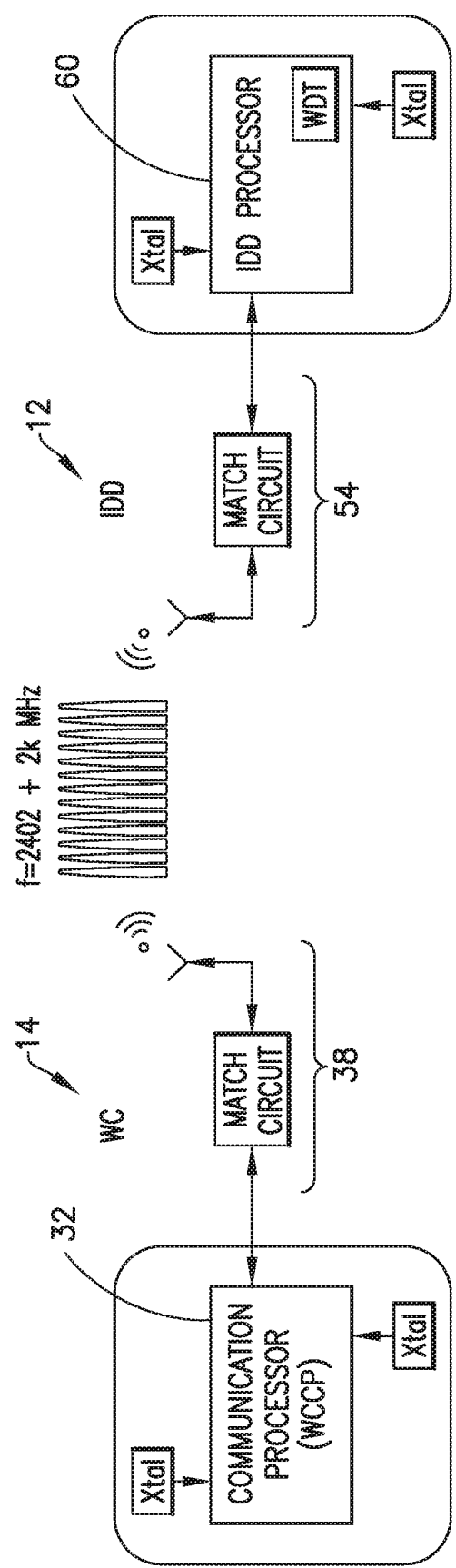
FIG. 3 is depicts radio frequency (RF) components of the medical device and the controller depicted in FIGS. 2A and 2B and in accordance with an illustrative embodiment of the present invention.

The WC 14 radio frequency (RF) interface with the IDD 12 is, for example, based on a Bluetooth® Low Energy or BLE-based communication protocol, although other wireless communication protocols can be used. In the medication delivery system 10, the WC 14 and IDD 12 communicate wirelessly within a distance of up to 10 feet or approximately 3 meters, utilizing the ISM band from 2400 MHz to 2480 MHZ spectrum. The WC 14 communicates with the IDD 12 while the IDD is adhered to the body in open air. The WC 14 is the central device or master, and the IDD 12 is the peripheral device or slave. Whenever the WCMP 30 wants to send information to the IDD 12 or retrieve information from the IDD 12, it does so by interacting with the WCCP 32, which in turn, communicates with the IDD 12 across the BLE link via the respective RF circuits 38 and 54, as shown in FIG. 3.

In accordance with an illustrative embodiment of the present invention, the WC 14 (e.g., its WCCP 32) and the IDD 12 communicate in accordance with a protocol and various operations to mitigate risk that the WC 14 pairs with an unintended IDD 12' or, vice versa, that an intended IDD 12 pairs with an unintended WC 14'. Either case could cause unintended operation of the pump mechanism 52, potentially resulting in insulin over-infusion which can be injurious to the patient. In accordance with aspects of the illustrative embodiment of the present invention, the communication range at IDD 12 startup (e.g., before pairing) is reduced, unintended devices such as an unintended IDD 12' is rejected by the WC 14 and, when multiple IDD co-existences are detected nearly, the WC 14 is prevented from pairing with an IDD 12 unless that IDD 12 is the only IDD detected by the WC 14. As described in more detail below, the protocol and operations in accordance with this illustrative embodiment of the present invention comprise reducing the transmit power level of the WC 14 and the IDD 12 to control the communication range (e.g., to less or equal to 20" before pairing), using signal strength indicators (e.g., the minimum and maximum Received Signal Strength Indicator (RSSI) thresholds) to reject the unintended devices including the unintended IDDs 12', adjusting WC 14 startup scanning time to detect multiple IDD co-existence, instructing the user to move to other room or location with his/her WC 14 and IDD 12 to retry the pairing when more than one IDD 12 is detected, and only allowing the WC 14 to pair with the IDD 12 when it is the only IDD 12 detected by the WC 14.

Figure 4:
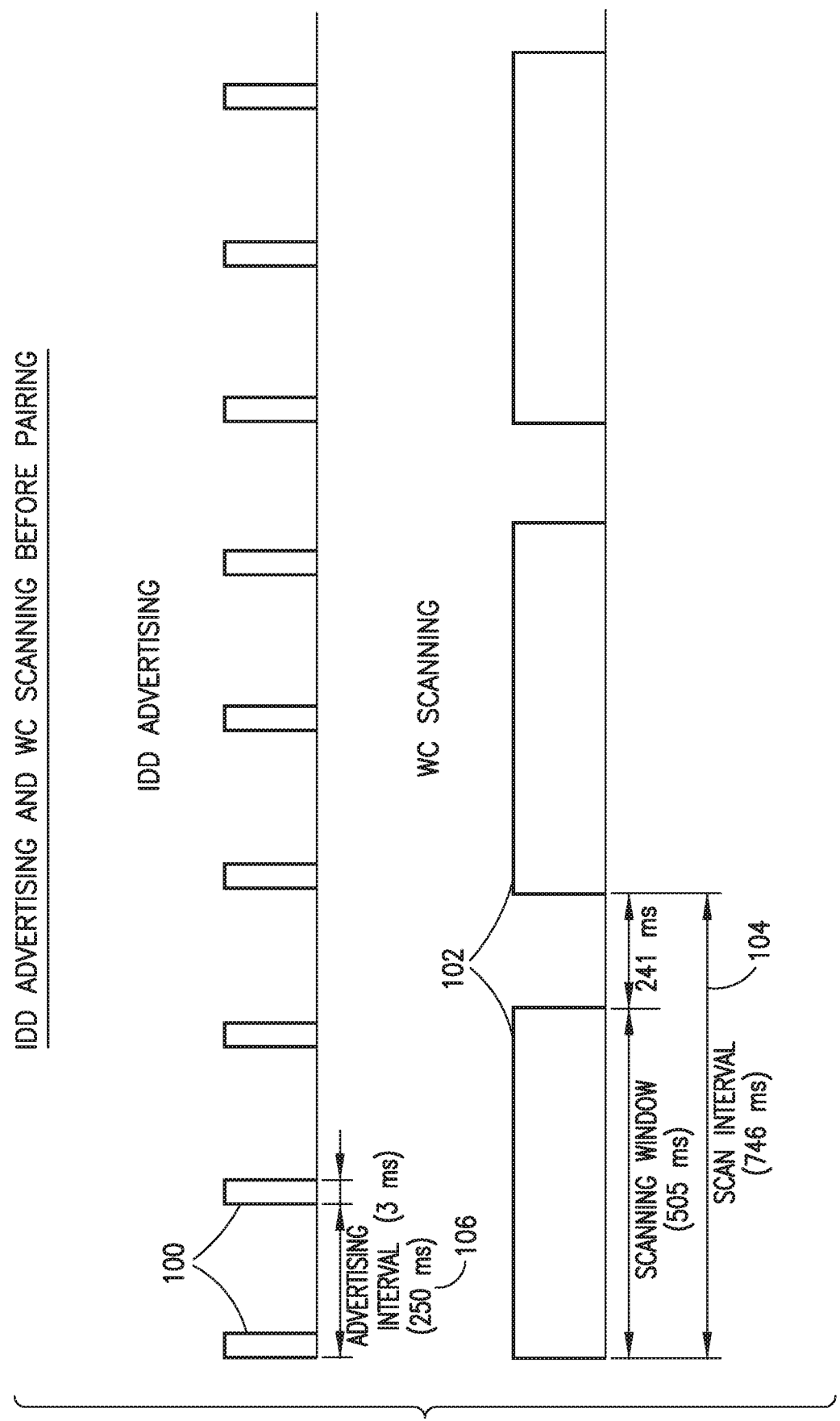
FIGS. 4, 5 and 6 are diagrams of signals transmitted from the medical device and the controller in accordance with an embodiment of the present invention.

IDD 12 advertising and WC 14 scanning before pairing are illustrated FIG. 4 and in accordance with an illustrative embodiment of the present invention. Upon waking up and before pairing, every 250 ms (+/−10%) as indicated at 106, the IDD 12 advertises with IDD Startup Advertising Data packets 100, and waits for 3 ms (+/−10%) for the possible reply from a WC 14. At the WCMP 30's request, the WCCP 32 initiates the communication by starting scanning the IDD advertisement every 746 ms (−/−10%) 104 for about a 505 ms (+/−10%) scanning window 102. At the end of the scanning period 104, WCCP 32 performs a co-existence check as described below in connection with FIGS. 7 and 8. At the end of the scanning time period 104, if the WCCP 32 does not detect any advertising packet 100 within a transport layer timeout period, the WCCP stops scanning and sends a Nack response with a Transmission Timeout error code. As described below in connection with FIGS. 7 and 8, after sending a Nack response, the WCCP 32 goes to sleep if no advertising is detected.

Figure 5:
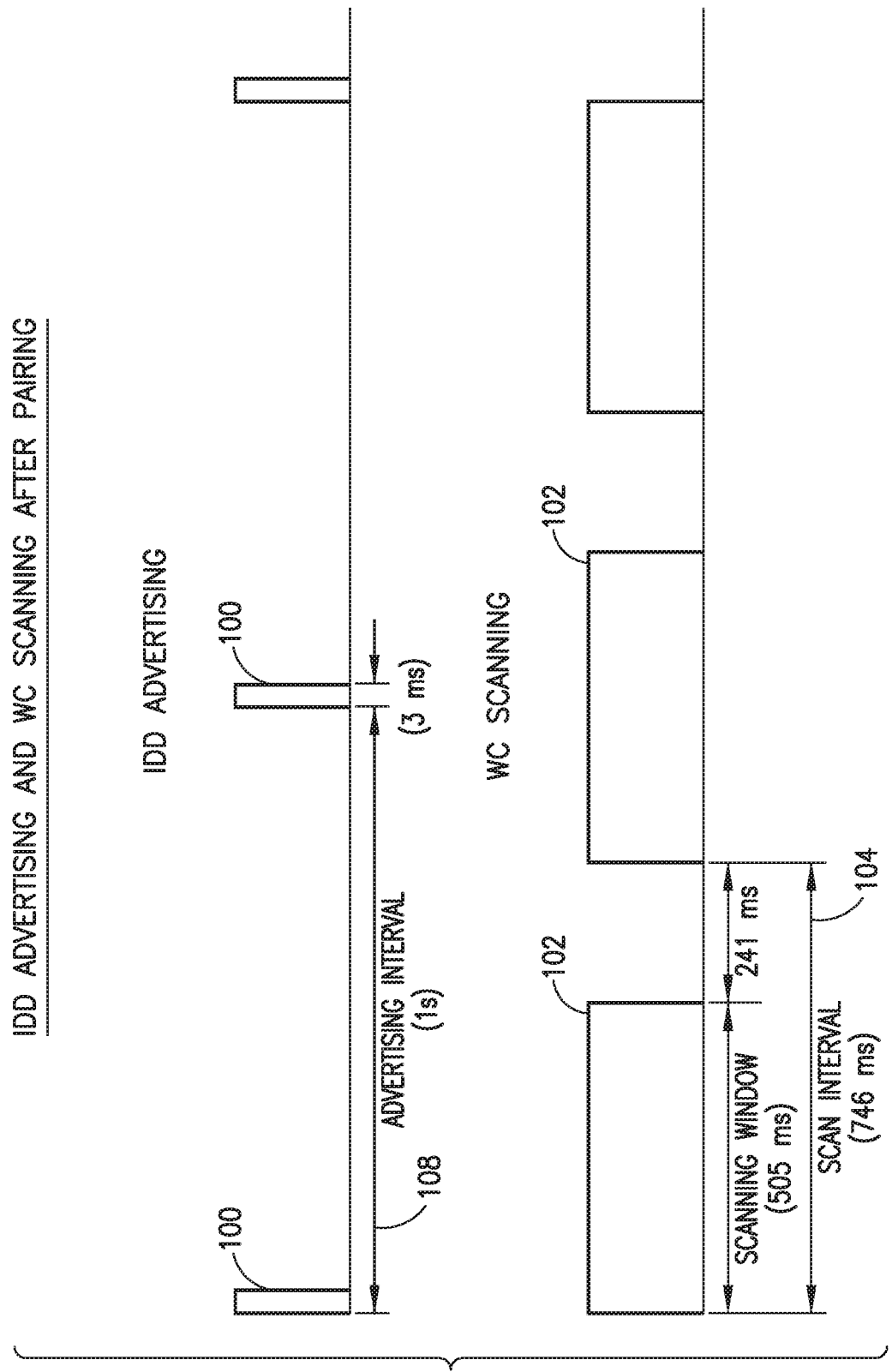

IDD 12 advertising and WC 14 scanning after pairing are illustrated FIG. 5 and in accordance with an illustrative embodiment of the present invention. After pairing, if the IDD 12 is not actively pumping, it advertises with a IDD Periodic Data Packet 100 at a selected interval 108 (e.g., every 1 second (+/−10%). After each advertisement 100, the IDD 12 waits for 30 ms (+/−10%) for the possible reply from the WC 14. After pairing, at the WCMP 30's request, the WCCP 32 initiates the communication by starting scanning the IDD advertisement every 746 ms (+/−10%) 104 for a 505 ms (+/−10%) scanning window 102.

Figure 6:
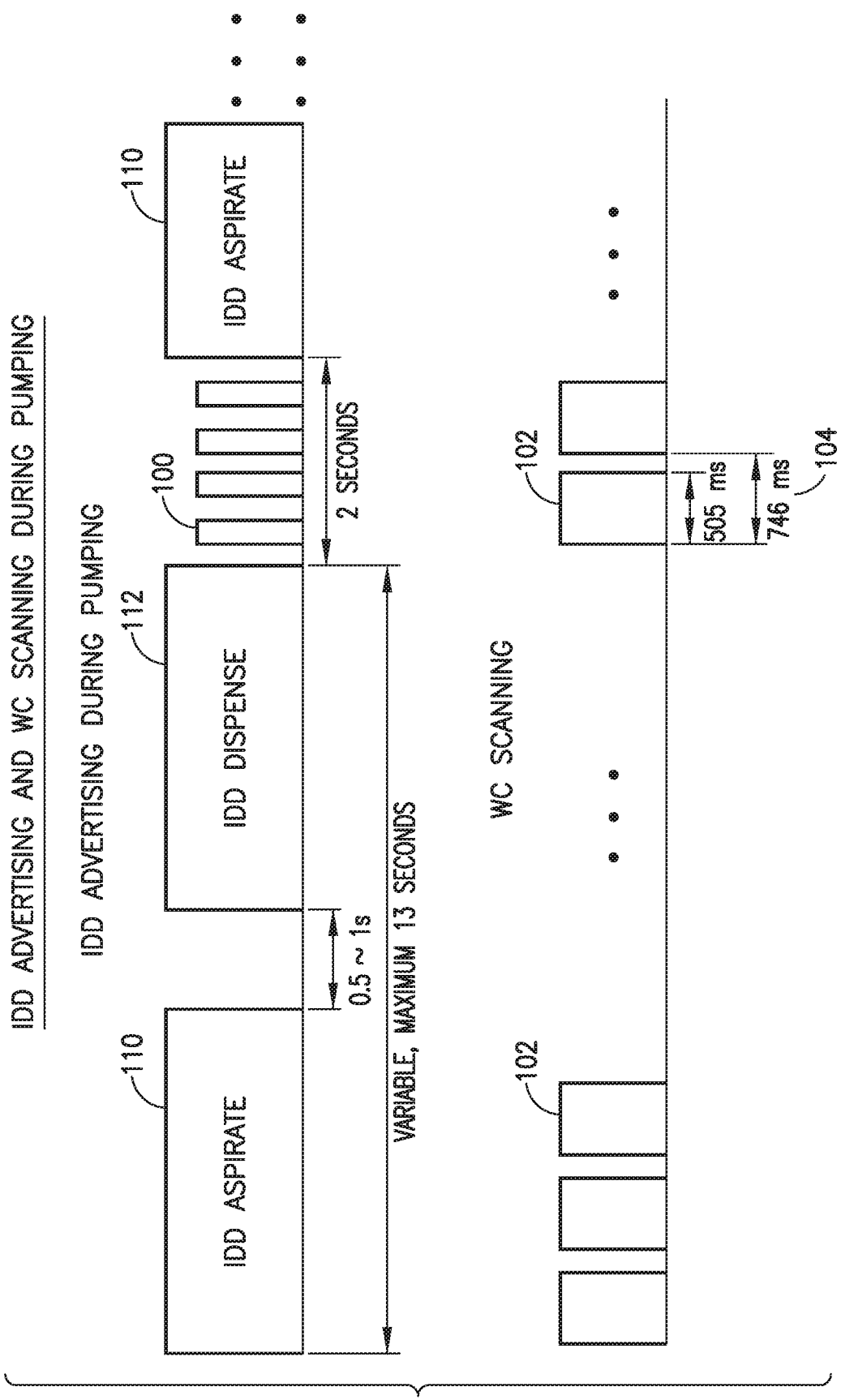

IDD 12 advertising and WC 14 scanning during pumping are illustrated in FIG. 6 and in accordance with an illustrative embodiment of the present invention. If the IDD 12 is delivering a medication such as insulin, it advertises every 500 ms for 2 seconds at the end of a dispense stroke 112. Even though it is not indicated in FIG. 6, during the break time between IDD aspirate periods 110 and dispense periods 112, the IDD 12 still attempts advertising if possible. When the IDD 12 is pumping, at the WCMP 30's request, the WCCP 32 initiates the communication by starting scanning the IDD advertisement every 746 ms (+/−10%) 104 for 505 ms (+/−10%) scanning windows 102.

Figure 7A:
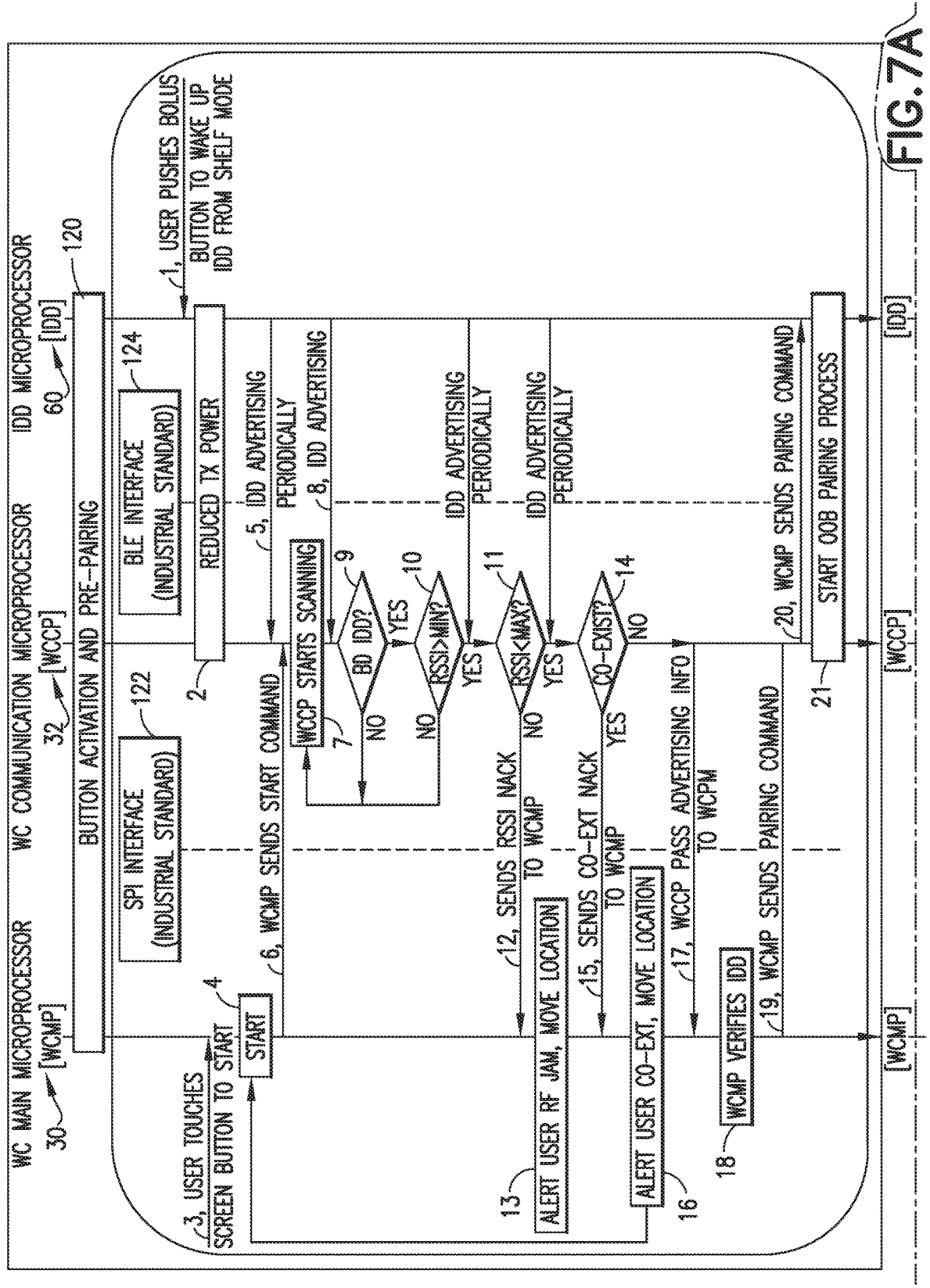
FIG. 7 is a diagram of operations of the medical device and the controller depicted in FIGS. 2A and 2B and in accordance with an illustrative embodiment of the present invention.

With reference to FIG. 7, operations are described for the WC 14 and IDD 12 in accordance with an embodiment of the present invention, and in particular with respect to the WCMP 30, WCCP 32 and IDD processor 60. An SPI interface between the WCMP 30 and WCCP 32 is shown; however, as explained above, the WC 14 can be configured as a single processor device. Also, as described above, a BLE interface or similar wireless interface 124 is provided between the WC 14 and the IDD 60. The operations are numbered 1 through 30 in FIG. 7 for ease of reference.

To commence pairing the WC 14 with an IDD 12, the IDD 12 can be awakened from a power conserving shelf mode (e.g., by a user activating button(s) 64), as indicated by operation 1 in FIG. 7. The IDD 12 reduces its transmission power (operation 2), and starts advertising IDD Startup Advertising Data (operation 5) with the transmit power level 0 up to 1 minute +/−10%. The IDD 12 periodically transmits an IDD Startup Advertising Data packet (operation 8). The WC 14 can be awakened from its power conserving sleep mode (e.g., as indicated in operation 3) in response to a user activating a button such as a touch screen 24 start button or other button 28, and enter a start mode (operation 4) such as the WCMP 30 sending a Start command to the WCCP 32. Upon receiving the Start command, the WCCP 32 starts scanning for the IDD Startup Advertising Data (operation 6) as described above in connection with FIG. 4.

With continued reference to FIG. 7 and to operation 9, the WC 14 can determine if a particular type of device 12 is in its vicinity. For example, the IDD 12 Startup Advertising Data can comprise IDD identifying information (e.g., selected dynamic and/or static parameters or values that identify a type of device such as manufacturer and/or model or other characteristic) such that the WC 14 can be configured to only pair with devices or IDDs having designated IDD identifying information and not with other devices that do not have the designated IDD identifying information. With reference to operation 9, the WCCP 32 can determine if the IDD 12 Startup Advertising Data has IDD identifying information relating, for example, to its particular manufacturer. If not, the WCCP 32 continues scanning (operation 7).

With reference to operation 10 in FIG. 7, if the WCCP 32 scans IDD Startup Advertising Data from a device in its vicinity that does have the designated IDD identifying information, then the WCCP 32 commences determining if signal strength information pertaining to the IDD Startup Advertising Data meets one or more thresholds. For example, the WCCP 32 can stop scanning and perform a Receiving Signal Strength Indicator (RSSI) check on the received packet. The RSSI information can be generated, for example, by an RF chip in the RF circuit 38 of the WC 14. If the RSSI is less than a minimum level (e.g., −65 dBm +/−10%), the WCCP 32 ignores the received advertising packet, and retries the scanning process (operation 7). The minimum level is selected to differentiate an IDD 12 advertising in the vicinity of the WC 14 from noise or an IDD 12 that is far enough away from the WC 14 to be an unintended device for pairing.

With reference to operation 11 in FIG. 7, if the RSSI is more than a maximum level (e.g., −3 dBm +/−10%) such as when an RF jam may have occurred, the WCCP 32 sends a Nack response to the WCMP 30 (e.g., a response with a Maximum RSSI Exceeded error code) as indicated at operation 12. The WCMP 30 can, in turn, generate an alert (e.g., via the LCD touch screen 24) to advise the user to move to another location (operation 13).

If, at the end of the scanning time period, the WCCP 32 detects the advertising packets from more than one IDD 12 (operation 14), the WCCP 32 sends a Nack response to the WCMP 30 (e.g., a response with a Co-existence Detected error code (operation 15). The WCMP 30 can, in turn, generate an alert (e.g., via the LCD touch screen 24) to advise the user to move to another location to retry pairing, and optionally that another IDD has been detected (operation 16).

If the RSSI and co-existence checks have passed, the WCCP 32 can send a IDD Startup Advertising Data response message to the WCMP 30 (operation 17). Upon receiving the response message, the WCMP 30 verifies the IDD Startup Advertising Data (e.g., using the designated IDD identifying information). If this IDD compatibility check is successful, the WCMP 30 sends a Pairing command message to the WCCP 32 (operation 19). Upon receiving the Pairing command, the WCCP 32 can perform a IPC sanity check on the pairing command message before sending the Pairing command to the IDD 12 (operation 20) to initiate the pairing process (operation 21).

For example, as indicated at operations 22 and 23 in FIG. 7, the IDD 12 can receive a Pairing request, and perform a sanity check that causes the IDD 12 to ignore the request if the sanity check fails, and to send a pairing response to the WCCP 32 if the sanity check succeeds. The IDD 12 and WCCP 32 can each perform a Pairing algorithm (operation 24). The pairing keys can be generated on the IDD 12 and WCCP 32 separately such that the air interface is not needed for pairing key exchange. The WCCP 32 saves the pairing key information to a nonvolatile memory location. The WCCP 32 confirms pairing by sending a low level confirmation packet to the IDD (operation 25). Upon receiving the WCCP 32's confirmation packet, the IDD 12 saves the pairing key information. Upon receiving the WCCP's confirmation packet, the IDD confirms the pairing by sending a low level confirmation packet back to the WCCP 32 (operation 26). Thus, the WCCP 14 and the IDD 32 facilitate the pairing key distribution (operation 27).

Upon receiving the IDD's confirmation packet, the WCCP 32 sends the Pairing Success message to the WCMP 30 (operation 28). Upon receiving the Pairing Success message, the WCMP 30 saves the pairing key information to a nonvolatile memory location for the record. After pairing, IDD transmit power level is set (e.g., to 15) to increase the communication range. Further, after pairing, the WCCP 32 transmit power level is also increased. The WC 14 only communicates with the paired IDD 12, and the IDD 12 only accepts a command from the paired WC 14. This bonded communication relationship of the WC 14 and IDD 12 remains until the IDD is deactivated. After IDD deactivation, the WC 14 is free to pair with a new IDD 12; however, at any given time, the WC 14 is preferably only allowed to pair with one IDD 12.

The WC 14 and IDD 12 operations in FIG. 8 is similar to those in FIG. 7, except that the co-existence check (operation 10) occurs before the signal strength (e.g., RSSI) checks (operations 13 and 14). In other words, the order of the co-existence and signal strength checks can be interchangeable. Also, the Device check (operation 9) can be optional.

In accordance with an aspect of the present invention, the WCCP 32 does not need to constantly scan operation 7 of FIGS. 7 and 8) which conserves WC 14 power. In other words, scanning by the WCCP can be interleaved such that scanning occurs for a selected duration (e.g., a 505 ms scanning window 102 as shown in FIG. 4) that is longer than two advertising intervals 106 (e.g., two 250 advertising intervals 106) by the IDD 12 to ensure that the WCCP 32 will not miss detecting a IDD Startup Advertising Data packet 100 from an IDD 12 within pairing range of the WC 14. The WCCP then stops scanning for a selected interval of time (e.g, 241 ms in FIG. 4) within a scanning interval 104 before scanning again for another scanning window 102 of time within the next scanning interval 104.

If an MD Startup Advertising Data packet 100 is detected during a scanning window 102, then the WCCP 32 stops scanning and commences one or more of the various checks described above in connection with FIGS. 7 and 8; that is, a device check (operation 9), received signal strength checks (operations 10 and 11) and a co-existence check (operation 14). If multiple devices are located via operation 14, or the other checks are not passed (i.e, operations 9, 10 and 11), then the WCCP 32 commences scanning again (operation 7).

If an IDD Startup Advertising Data packet 100 is not detected during a scanning window 102, then the WCCP 32 can scan over a series of scan intervals 104 for a selected amount of time (e.g., 10 seconds) and then timeout, Upon timeout, the WCCP 32 can send a Nack signal to the WCMP 30 which, in turn, alerts the user regarding a communication error and the need to bring an intended IDD 12 closer to the WC 14 and retry pairing.

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can he performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

The various illustrative logical blocks, modules, and circuits described in connection with the embodiments disclosed herein may be implemented or performed with general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may he represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM). Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in the remote station, Electronic medical device, a server, or a combination thereof. In the alternative, the processor and the storage medium may reside as discrete components in a user terminal.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

The invention claimed is:

1. A method of pairing a first device with a second device for wireless communication therebetween comprising:

the first device transmits signals for a selected duration at selected intervals and in a selected radio frequency range;

the second device scans for signals in the selected radio frequency range, the second device being provided with signal strength data related to respective signals detected when scanning;

the second device determines whether the signal strength data for at least one of the detected signals satisfies signal strength criteria whereby the signal strength data is greater than a selected minimum signal strength criterion and is less than a selected maximum signal strength criterion;

the second device determines whether the detected signals are from either the first device or another device; and the second device sends the first device a pairing command when the detected signals satisfy the signal strength criteria and the second device determines that the detected signals are only from the first device and not from another device, the second device preventing pairing with the first device when the detected signals are determined to also be from another device.

2. The method of claim 1, wherein the second device alerts a user to move to another location to attempt pairing the first device with the second device when the signal strength data for at least one of the detected signals is more than a selected maximum signal strength criterion, and when the detected signals are from another device and not the first device.

3. The method of claim 1, wherein the second device ignores the detected signals having signal strength data that is less than the selected minimum signal strength criterion.

4. The method of claim 1, wherein the first device has an identifier shared by other devices similar to the first device, and the second device is configured to pair in a selected time period with any one of the first device and the other devices sharing the identifier and not with other devices which do not share the identifier.

5. The method of claim 1, wherein the second device can determine whether the detected signals are from either the first device or another device before determining whether the signal strength data for at least one of the detected signals satisfies signal strength criteria.

6. The method of claim 1, wherein the selected radio frequency range can be 2.40-2.48 Gigahertz (GHz) range.

7. The method of claim 1, further comprising
the first device reduces its transmit power before transmitting its signals for the selected duration at the selected intervals and in the selected radio frequency range;
the first device receives the pairing command; and
the first device increases its transmit power after pairing with the second device is completed.

8. The method of claim 7, wherein the first device reduces its transmit power before pairing is completed to a transmit power level that limits the communication range between the first device and the second device to a selected distance.

9. The method of claim 8, wherein the selected distance is between 0 and 20 inches.

10. The method of claim 1, wherein the second device scans for signals in the selected radio frequency range during scanning intervals, each scanning interval comprising a scanning window of a duration longer than two of the selected intervals followed by a non-scanning period to detect if other devices are transmitting signals at the selected intervals and in the selected radio frequency range in addition to the first device.

11. The method of claim 10, wherein, if the second device detects a signal during a scanning window, then the second device stops scanning and performs at least one or more of various checks selected from the group consisting of determining whether identifying data in the signal corresponds to an intended device for pairing, determining whether received signal strength data related to the signal satisfies one or more signal strength criteria, and determining whether the signal is from the first device and not from another device, and the second device continues scanning when any of the checks fails.

12. The method of claim 10, wherein, if the second device fails to detect a signal during a scanning window, then the second device continues scanning over a series of scanning intervals for a selected amount of time.

13. A device configured for pairing with a second device for wireless communication therebetween, the device comprising:
a radio frequency (RF) interface for transmitting and receiving RF signals, the received RF signals comprising advertising signals of selected duration transmitted from the second device at selected intervals in a selected RF range; and
a controller configured to
scan for signals in the selected radio frequency range, the controller being provided with signal strength data related to respective signals detected when scanning;
determine whether the signal strength data for at least one of the detected signals satisfies signal strength criteria whereby the signal strength data is greater than a selected minimum signal strength criterion and is less than a selected maximum signal strength criterion;
determine whether the detected signals are from either the second device or another device; and
send the second device a pairing command when the detected signals satisfy the signal strength criteria and the controller determines that the detected signals are only from the second device and not from another device, and prevent pairing with the second device when the detected signals are determined to also be from another device.

14. The device of claim 13, wherein the controller scans for signals in the selected RF range during scanning intervals, each scanning interval comprising a scanning window of a duration longer than two of the selected intervals followed by a non-scanning period to detect if other devices are transmitting signals at the selected intervals and in the selected radio frequency range in addition to the first device.

15. The device of claim 13, wherein the controller alerts a user to move to another location to attempt pairing of the second device when the signal strength data for at least one of the detected signals is more than a selected maximum signal strength criterion, and when the detected signals are from another device and not the second device.

16. The device of claim 13, wherein the controller ignores the detected signals having signal strength data that is less than the selected minimum signal strength criterion.

17. The device of claim 13, wherein the second device has an identifier shared by other devices similar to the second device, and the controller is configured to pair in a selected time period with any one of the second device and the other devices sharing the identifier and not with other devices which do not share the identifier.

18. The device of claim 13, wherein the controller scans for signals in the selected radio frequency range during scanning intervals, each scanning interval comprising a scanning window of a duration longer than two of the selected intervals followed by a non-scanning period to detect if other devices are transmitting signals at the selected intervals and in the selected RF range in addition to the second device.

19. The device of claim 18, wherein, if the controller detects a signal during a scanning window, then the controller stops scanning and performs at least one or more of various checks selected from the group consisting of determining whether identifying data in the signal corresponds to an intended device for pairing, determining whether received signal strength data related to the signal satisfies one or more signal strength criteria, and determining whether the signal is from the second device and not from another device, and the controller continues scanning when any of the checks fails.

20. The device of claim 18, wherein, if the controller fails to detect a signal during a scanning window, then the controller continues scanning over a series of scanning intervals for a selected amount of time.

* * * * *